(12) United States Patent
Richardson et al.

(10) Patent No.: US 8,511,589 B2
(45) Date of Patent: Aug. 20, 2013

(54) APPARATUS FOR SPREADING GRANULAR MATERIALS FROM VEHICLE

(75) Inventors: Shannon B. Richardson, Earlville, IA (US); Mark S. Hollinrake, Marion, IA (US); Mart E. Ward, Manchester, IA (US); Glenn L. Ungerer, Swisher, IA (US)

(73) Assignee: Henderson Products, Inc., Manchester, IA (US)

( * ) Notice: Subject to any disclaimer, the term of this patent is extended or adjusted under 35 U.S.C. 154(b) by 100 days.

(21) Appl. No.: 13/018,027

(22) Filed: Jan. 31, 2011

(65) Prior Publication Data

US 2011/0186649 A1    Aug. 4, 2011

Related U.S. Application Data

(60) Provisional application No. 61/299,501, filed on Jan. 29, 2010.

(51) Int. Cl.
*E01C 19/00* (2006.01)
*A01C 23/00* (2006.01)
*A01C 19/00* (2006.01)

(52) U.S. Cl.
USPC ........... 239/687; 239/662; 239/672; 239/675; 239/681; 239/689

(58) Field of Classification Search
USPC ................ 239/650, 657, 662, 665, 666, 672, 239/673, 675, 681, 687, 688, 689
See application file for complete search history.

(56) References Cited

U.S. PATENT DOCUMENTS

| | | | |
|---|---|---|---|
| 5,947,391 A * | 9/1999 | Beck et al. | 239/677 |
| 5,988,535 A * | 11/1999 | Kime | 239/687 |
| 6,123,276 A | 9/2000 | Ungerer et al. | |
| 6,220,532 B1 * | 4/2001 | Manon et al. | 239/672 |
| 6,394,735 B2 | 5/2002 | Hollinrake et al. | |
| 6,585,472 B2 | 7/2003 | Hollinrake et al. | |
| 6,761,525 B2 | 7/2004 | Hollinrake et al. | |
| 6,945,482 B2 | 9/2005 | Hollinrake et al. | |
| 6,976,740 B1 | 12/2005 | Hollinrake et al. | |
| 7,370,818 B2 | 5/2008 | Ward et al. | |
| 7,530,777 B2 | 5/2009 | Hintzsche et al. | |
| 2001/0014273 A1 | 8/2001 | Hollinrake et al. | |
| 2001/0046432 A1 | 11/2001 | Hollinrake et al. | |
| 2002/0110443 A1 | 8/2002 | Hollinrake et al. | |
| 2002/0117562 A1 * | 8/2002 | Kost | 239/666 |
| 2003/0026680 A1 | 2/2003 | Hollinrake et al. | |
| 2003/0168535 A1 | 9/2003 | Hollinrake et al. | |
| 2004/0124260 A1 | 7/2004 | Ward et al. | |

(Continued)

*Primary Examiner* — Darren W Gorman
(74) *Attorney, Agent, or Firm* — Leydig, Voit & Mayer, Ltd.

(57) ABSTRACT

A material spreader is adapted to dispense granular material from a vehicle. The material spreader includes a feed chute having a discharge opening and a discharge disc assembly disposed below the feed chute. The discharge disc assembly includes a spinner disc adapted to receive granular material from the feed chute, a shroud disposed in at least partial covering relation to the spinner disc, and a rotational drive operatively connected to the spinner disc such that the spinner disc is rotatable within the shroud about a rotational axis. The shroud includes a pass-through opening disposed in substantially aligned relation with the discharge opening of the feed chute at a position radially removed from the central rotational axis. The discharge disc assembly is rotatably mounted in pivoting relation about a pivot axis extending through the pass-through opening and the discharge opening of the feed chute.

23 Claims, 9 Drawing Sheets

(56) References Cited

U.S. PATENT DOCUMENTS

| | | |
|---|---|---|
| 2005/0072868 A1* | 4/2005 | Rochat .......................... 239/650 |
| 2005/0111946 A1 | 5/2005 | Hintzsche et al. |
| 2005/0230507 A1 | 10/2005 | Hollinrake et al. |
| 2005/0231021 A1 | 10/2005 | Hollinrake et al. |
| 2006/0049287 A1* | 3/2006 | Holverson et al. ............ 239/657 |
| 2008/0203187 A1 | 8/2008 | Ward et al. |
| 2009/0269183 A1 | 10/2009 | Richardson et al. |
| 2010/0096469 A1 | 4/2010 | Holverson et al. |
| 2011/0188979 A1 | 8/2011 | Ketels et al. |

* cited by examiner

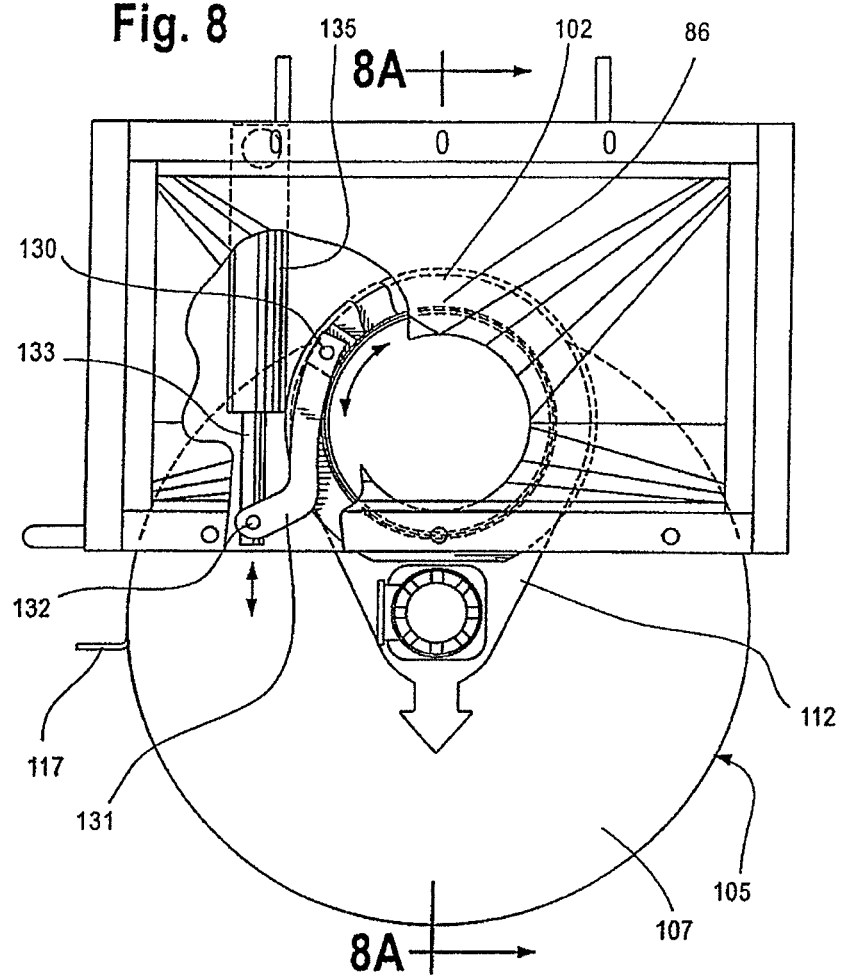
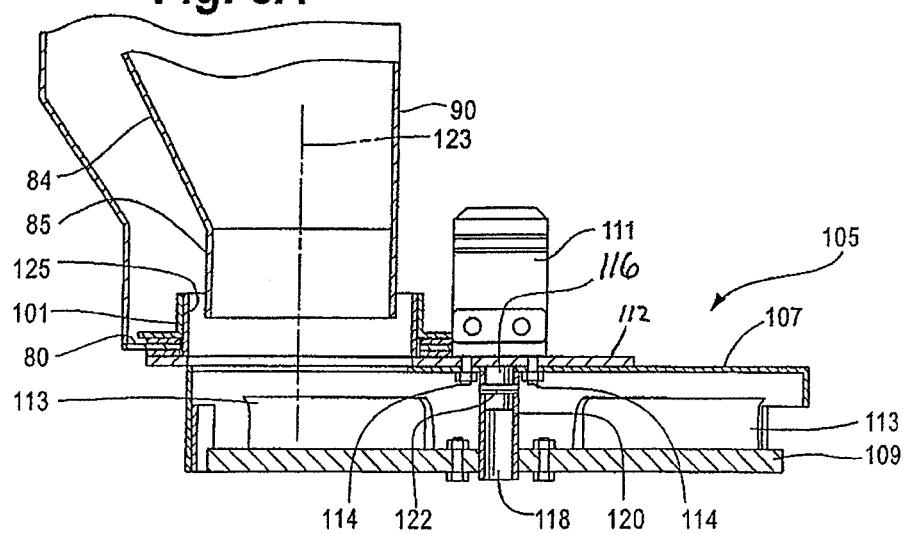

APPARATUS FOR SPREADING GRANULAR MATERIALS FROM VEHICLE

CROSS-REFERENCE TO RELATED APPLICATIONS

This patent application claims the benefit of priority to U.S. Provisional Patent Application No. 61/299,501, filed on Jan. 29, 2010, and entitled "Apparatus For Spreading Granular Materials From a Vehicle," which is incorporated in its entirety herein by this reference.

TECHNICAL FIELD

The present invention relates generally to a vehicle with a spreader apparatus that provides for selective spreading of granular material such as sand, salt and the like, onto surfaces such as roadways. More particularly, the present invention relates to a spreader apparatus adapted to control the direction and character of the disbursement pattern to reduce waste of the granular material.

BACKGROUND

Many systems are available to provide for the spreading of material, such as sand, salt, gravel, asphalt and the like, onto a surface. By way of example only, a conventional dump or V-box vehicle can include a conveyor system that transports material residing within a body of the vehicle out of the body and into one or more spreaders mounted on the exterior of the vehicle. Such conveyor systems typically include a longitudinal screw or endless conveyor located within the body that transports the material from the front to the rear of the body. A conventional spreader is mounted on the rear of the vehicle to receive the material for discharge onto the roadway.

Today, municipalities dispense granular materials on roadways during slick winter conditions to improve traction for vehicles driving in those conditions. Salt is sometimes used to melt snow and ice, while other materials, such as sand, for example, can be used to improve traction. Significant direct costs are incurred in this process, including the costs for the materials themselves as well as equipment and labor costs involved in the application of the materials. Time is also spent traveling to and from the stockpiles of material and back to the various routes throughout the region.

The placement process of such material on roadways has historically involved two methods. The first method utilizes a rotating "spinner disc," as will be known to those of skill in the art. In this process, metered amounts of granular material are dropped onto the spinning disc, which spins about a vertical axis. The disc includes a plurality of ridges or vanes oriented in a generally spoke-like arrangement. As the disc rotates, material is thrown in a pattern onto the roadway. A slow turning disc distributes the material in a relatively narrow pattern approximately a few feet in width. Higher rotational speeds can create spread width patterns of forty feet or more. A series of baffles and diverters placed around the disc can aid in narrowing the pattern to produce a more desirable spread pattern. However, such baffles and diverters provide only limited control over material placement.

The second common method for spreading materials on roadways is to drop the material directly onto the road surface in either a narrow strip or metered across a much wider path, approximately six to seven feet. The narrow strip is accomplished by discharging the material through a single opening, while a wider path can be created using a "roll type" spreader. However, both of these methods involve dropping material straight down onto the roadway (i.e. with no pattern control of the particles).

Both of these methods can result in efficiency problems. For example, application rates are usually increased to compensate for losing the material to non-roadway surfaces. Accordingly, material costs increase as a result of spreading material on areas where it is not needed. Fuel costs increase as many more trips are spent to and from the material stockpiles to replenish the material spread upon the roadways. More equipment and operators are needed to cover the roads within the same time period because of this increase in lost time traveling to stockpiles.

In recent years, the practice of adding liquid to salt to aid in the melting of snow and ice has become more common. Brine (salt water) and other liquids are frequently added to the salt (sometimes referred to as "pre-wetting"), and the chemical reactions of melting snow are more quickly activated. Advantages of this wetter material (in addition to causing the salt to act faster) include: providing a stickier material that adheres to the road better; reducing the bounce of material to areas outside the targeted zone to allow for further reductions in salt application rates which extend truck routes; and reducing refill trips and the number of vehicles needed to support a municipality. Units which dispense this wetter material mix are currently available from multiple commercial sources. However, such units have relatively high capital costs and can be difficult to operate and maintain due to their complexity.

In view of the foregoing, there exist various needs in the art. One such need is for a spreader that helps control the dispensing of particles to permit selective application of particulate material to a roadway in a predetermined pattern relative to the vehicle travel path. Another need is for a spreader system that allows an operator to readily adjust the character of the dispensing pattern.

SUMMARY OF THE INVENTION

The present disclosure is directed to addressing the foregoing and other needs by providing a spreader apparatus incorporating a selectively movable discharge disc assembly for controlled, patterned dispensing of granular material.

According to one exemplary aspect, a material spreader is provided which is adapted to dispense granular material from a vehicle. The material spreader includes a feed chute having a discharge opening and a discharge disc assembly disposed below the feed chute. The discharge disc assembly includes a spinner disc adapted to receive granular material from the feed chute, a shroud disposed in at least partial covering relation to the spinner disc, and a rotational drive operatively connected to the spinner disc such that the spinner disc is rotatable within the shroud about a rotational axis. The shroud includes a pass-through opening disposed in substantially aligned relation with the discharge opening of the feed chute at a position radially removed from the rotational axis. The discharge disc assembly is rotatably mounted in pivoting relation about a pivot axis extending through the pass-through opening and the discharge opening in the feed chute such that the discharge disc assembly is selectively rotatable through an angle about the pivot axis.

According to another exemplary aspect, a material spreader is provide which is adapted to dispense granular material from a vehicle. The material spreader includes a feed chute having a discharge opening and a discharge disc assembly disposed below the feed chute. The discharge disc assembly includes a spinner disc adapted to receive granular material from the feed chute, a shroud disposed in at least partial covering relation to the spinner disc, and a rotational drive operatively connected to the spinner disc such that the spinner disc is rotatable within the shroud about a substantially central rotational axis. The shroud includes a pass-through opening disposed in substantially aligned relation with the discharge opening of the feed chute assembly at a position radially removed from the central rotational axis. A turret connection holds the discharge disc assembly in pivoting relation about a pivot axis extending through the pass-through opening and the discharge opening in the feed chute such that the discharge disc assembly rotates through an angle about the pivot axis upon rotation of the turret connection.

According to another exemplary aspect, a material spreader is provided which is adapted to dispense granular material from a vehicle. The material spreader includes a feed chute assembly adapted to transport the granular material away from a material outlet port in fluid communication with a material storage compartment at the vehicle. A discharge disc assembly projects outwardly from the vehicle at a position below the feed chute assembly. The discharge disc assembly includes a spinner disc adapted to receive granular material from the feed chute and a shroud disposed in at least partial covering relation to the spinner disc. The spinner disc is operatively connected to a rotational drive such that the spinner disc is rotatable within the shroud about a substantially central rotational axis. The shroud includes a pass-through opening disposed in substantially aligned relation with a discharge opening in the feed chute assembly at a position radially removed from the central rotational axis. A turret connection holds the discharge disc assembly in pivoting relation about a pivot axis extending through the pass-through opening and the discharge opening in the feed chute assembly such that the discharge disc assembly rotates through an angle about the pivot axis upon rotation of the turret connection. A linear drive member having a selectively extensible and retractable arm is operatively connected to a portion of the turret connection such that extension or retraction of the arm produces rotational movement of the turret connection and corresponding rotation of the discharge disc assembly.

According to another exemplary aspect, a vehicle is provided including a chassis with a body mounted on the chassis. The body is adapted to store a mass of granular material. A conveyor assembly is adapted to transport the granular material out of the body. A material spreader includes a feed chute adapted to receive granular material from the conveyor assembly and to discharge granular material out a discharge opening thereof and a discharge disc assembly disposed below the feed chute. The discharge disc assembly includes a spinner disc adapted to receive granular material from the discharge opening of the feed chute, a shroud disposed in at least partial covering relation to the spinner disc, and a rotational drive operatively connected to the spinner disc such that the spinner disc is rotatable within the shroud about a substantially central rotational axis. The shroud includes a pass-through opening disposed in substantially aligned relation with the discharge opening of the feed chute at a position radially removed from the central rotational axis. The discharge disc assembly is rotatably mounted in pivoting relation about a pivot axis extending through the pass-through opening and the discharge opening of the feed chute such that the discharge disc assembly is selectively rotatable through an angle about the pivot axis.

According to yet another exemplary aspect, a vehicle is provided including a chassis with a body mounted on the chassis. The body is adapted to store a mass of granular material. A conveyor assembly transports the granular material to an outlet port for passage of the granular material out of the body. A material spreader is in fluid communication with the conveyor assembly. The material spreader includes a feed chute assembly adapted to transport the granular material away from a material outlet port and a discharge disc assembly projecting outwardly from the vehicle at a position below the feed chute assembly. The discharge disc assembly includes a spinner disc adapted to receive granular material from the feed chute assembly and a shroud disposed in at least partial covering relation to the spinner disc. The spinner disc is operatively connected to a rotational drive such that the spinner disc is rotatable within the shroud about a substantially central rotational axis. The shroud includes a pass-through opening disposed in substantially aligned relation with a discharge opening in the feed chute assembly at a position radially removed from the central rotational axis. A turret connection holds the discharge disc assembly in pivoting relation about a pivot axis extending through the pass-through opening and the discharge opening in the feed chute assembly such that the discharge disc assembly rotates through an angle about the pivot axis upon rotation of the turret connection.

BRIEF DESCRIPTION OF THE DRAWINGS

FIG. 8 is a top plan view of the spreader apparatus of FIG. 1, illustrating details of an exemplary articulation system adapted to rotate the spinner disc over a range of travel;

FIG. 8A is a cross-sectional view taken generally along line 8A-8A in FIG. 8.

DETAILED DESCRIPTION OF EXEMPLARY EMBODIMENTS

Figure 1:
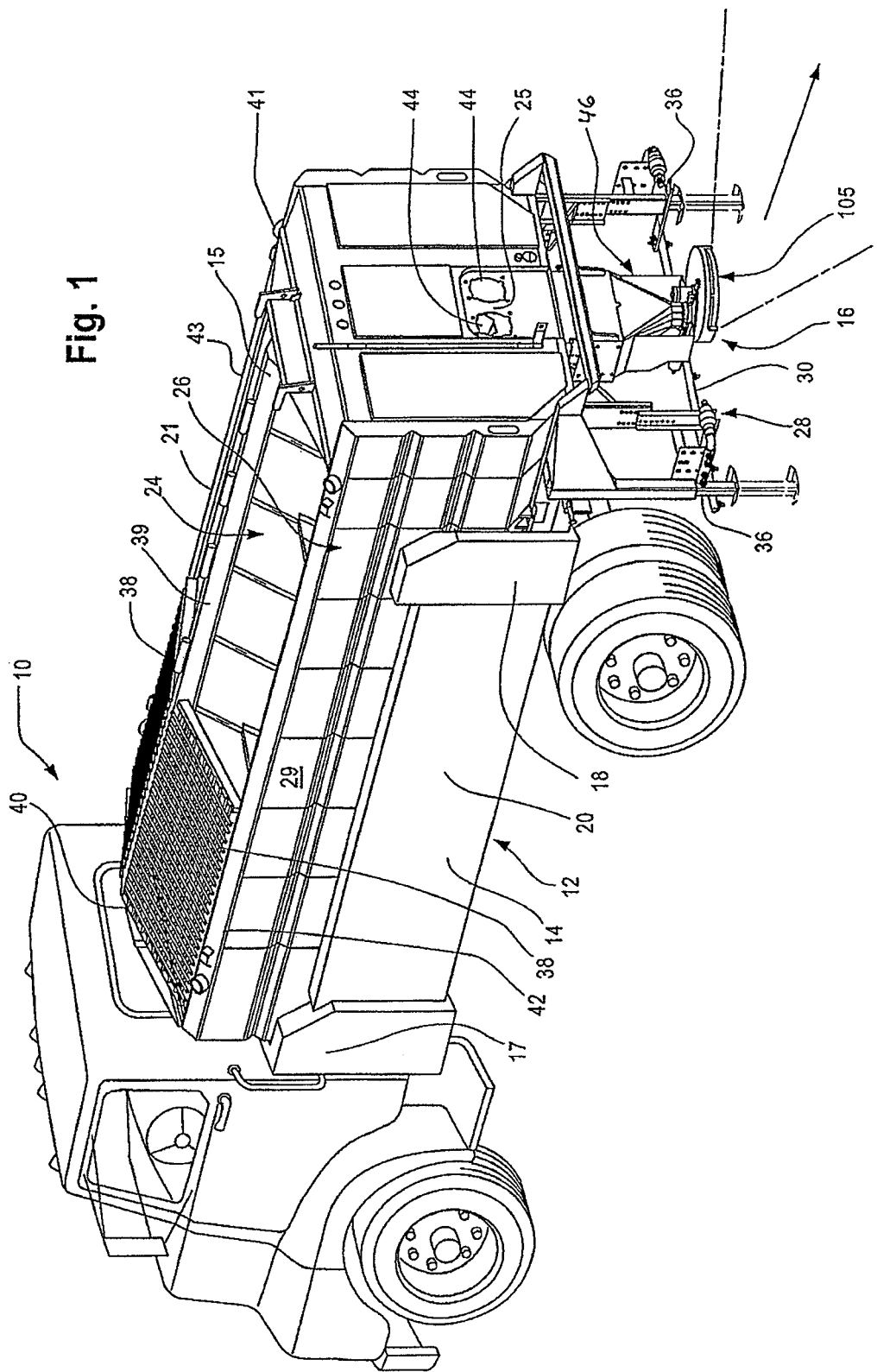
FIG. 1 is a perspective side view of an embodiment of a vehicle with a body and a spreader apparatus consistent with the present disclosure.

Reference will now be made to the drawings wherein, to the extent possible, like reference numerals are utilized to designate like elements throughout the various views. FIG. 1 illustrates a vehicle 10 having a chassis 12, a body 14 mounted to the chassis 12, a removable storage and dispensing apparatus 15 disposed within the body 14, and a material spreader 16 mounted to the storage and dispensing apparatus 15.

As shown, the body 14 includes a front end 17, an open rear end 18, and a pair of sidewalls 20, 21 extending longitudinally therebetween. The body 14 is generally U-shaped. The body 14 defines a cavity for storing materials, such as gravel, dirt, brush or the like. The dump body 14 can be pivotally connected to the chassis 12 at the rear end 18 of the body 14. A hoist system can be provided to move the body 14 from a storing position, shown in FIG. 1, to one of a range of dumping positions. The illustrative vehicle 10 in FIG. 1 includes an underbody hoist system. In other embodiments, the hoist can be a telescopic hoist adjacent the front end 16 of the body 14.

The storage and dispensing apparatus 15 includes a hopper 24 for storing material, such as, a granular ice control material, for example, a conveyor assembly 25 for selectively transporting material from the hopper 24, a liquid storage system 26 for storing liquid, such as, an anti-icing liquid, for example, and a liquid dispensing system 28 for selectively dispensing liquid from the liquid storage system 26. The storage and dispensing apparatus 15 can be similar in construction and operation to those shown and described in U.S. Patent Application Publication No. US 2004/0124260 A1, entitled, "Apparatus for Treatment of Snow and Ice," which is incorporated herein by reference. In operation, liquid stored within liquid storage areas 29 of the liquid storage system 26 may be conveyed to a spray bar 30 or other dispensing device of the liquid dispensing system for application to the roadway surface.

In the illustrated arrangement, the storage and dispensing apparatus 15 includes a pair of retractable support legs 36 extending downwardly from positions adjacent to the rear end 18. As will be appreciated, the support legs 36 may be in a lowered position as the vehicle 10 maneuvers into position relative to the storage and dispensing apparatus 15 and are then raised once the storage and dispensing apparatus 15 is in place over the body 14. In other embodiments, any other suitable support arrangement may likewise be utilized if desired.

In the illustrated arrangement, the hopper 24 of the storage and dispensing apparatus 15 includes internal sloping walls adapted to urge salt or other granular material to move downwardly toward the base of the hopper as the quantity of material stored within the hopper 24 is reduced. The hopper 24 includes a top opening for receiving material. A plurality of grate screens 38 (two shown) can be provided to cover the opening of the hopper 24. The grate screens 38 are pivotally mounted to a central ridge 39 extending between the front and rear ends 40, 41 of the storage and dispensing apparatus 15. An outer edge of each screen rests on a one of a pair of ledges of the first and second side walls 42, 43 of the storage and dispensing apparatus 15. To open the screens 38, the screens can be pivoted about the central ridge 39 such that the outer edge of the screen engages the ledge of the opposing side wall.

The grate screens 38 can act to prevent larger chunks of material from entering the hopper 24. In the winter, for example, granular material is often stored in a large stockpile before being loaded onto a vehicle. The granular material can freeze and form larger chunks of material. The larger chunks can hinder the flow of material being dispensed from the vehicle for treatment of a roadway, for example. With the screens covering the top opening of the hopper, an operator can load the hopper by depositing granular material onto the grates. Larger chunks tend to roll off the body and can be broken up for subsequent use.

The grate screens 38 also provide a safety feature in providing a barrier between the outside of the hopper and the conveyor assembly 25 found therein. In some embodiments, the grate screens can be interconnected to the hydraulic system with an interlock system such that the screens cannot be opened until the hydraulic system is disconnected. The interlock system can be one such as is shown and described in U.S. Pat. No. 6,123,276, issued to Ungerer et al. on Sep. 26, 2000, or U.S. Pat. No. 7,530,777 to Hintzsche et al. on May 12, 2009, for example.

The conveyor assembly 25 can act to selectively dispense material from the hopper 24. The conveyor assembly 25 can include a pair of augers 44 disposed in substantially parallel, spaced relationship to each other. In operation, the augers 44 draw the granular material toward the rear end of the vehicle at which point the material may fall through a floor opening disposed generally below the ends of the conveyor assemblies. As will be appreciated, while the illustrated arrangement incorporates two augers 44, any other suitable conveyor assembly adapted to draw particulate material to a defined discharge location may likewise be used. For example, in other embodiments, the conveyor assembly can include an endless chain conveyor, a single auger, three or more augers, one or more belt conveyors, etc.

Figure 2:
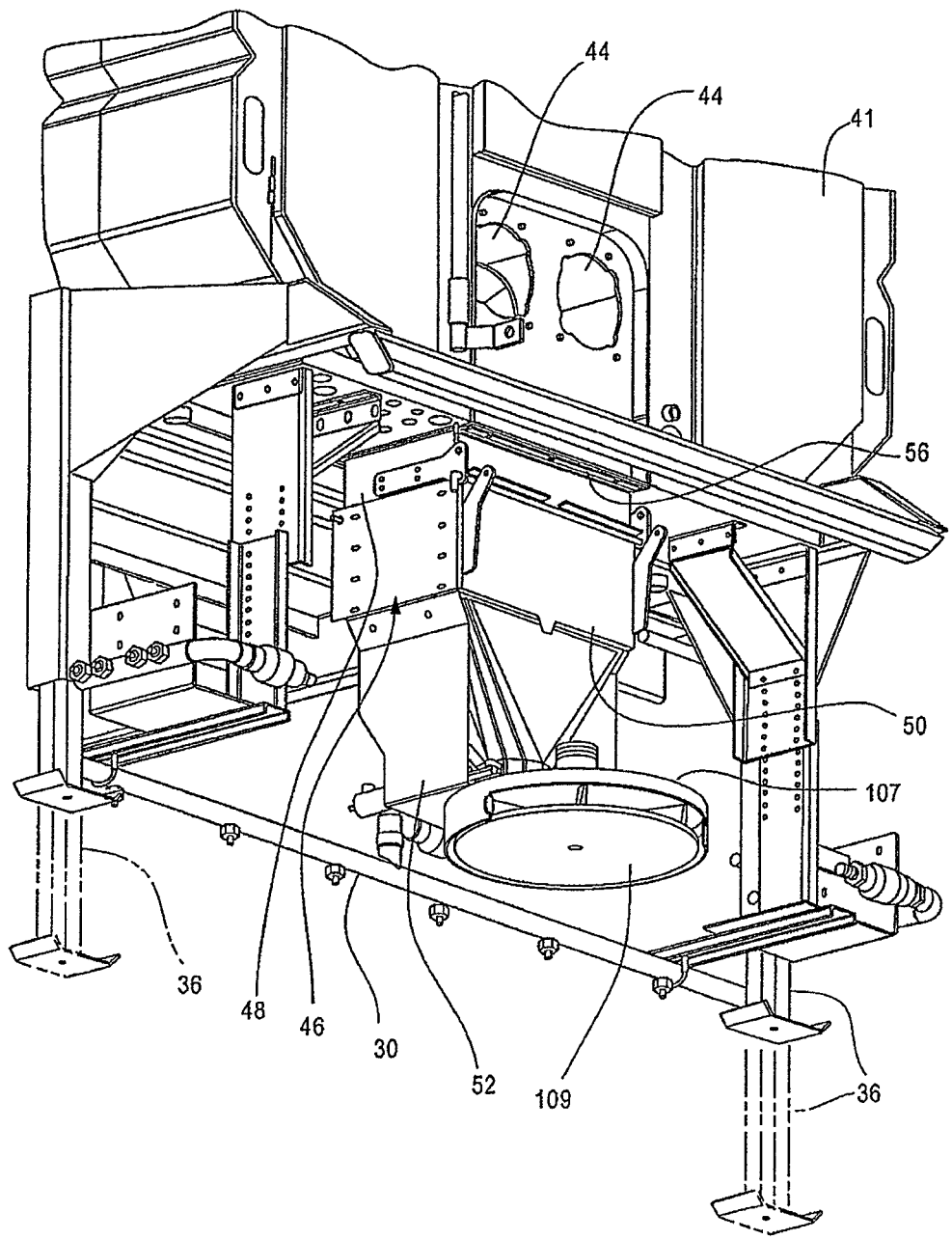
FIG. 2 is a fragmentary, perspective end view of the vehicle of FIG. 1.
Figure 3:
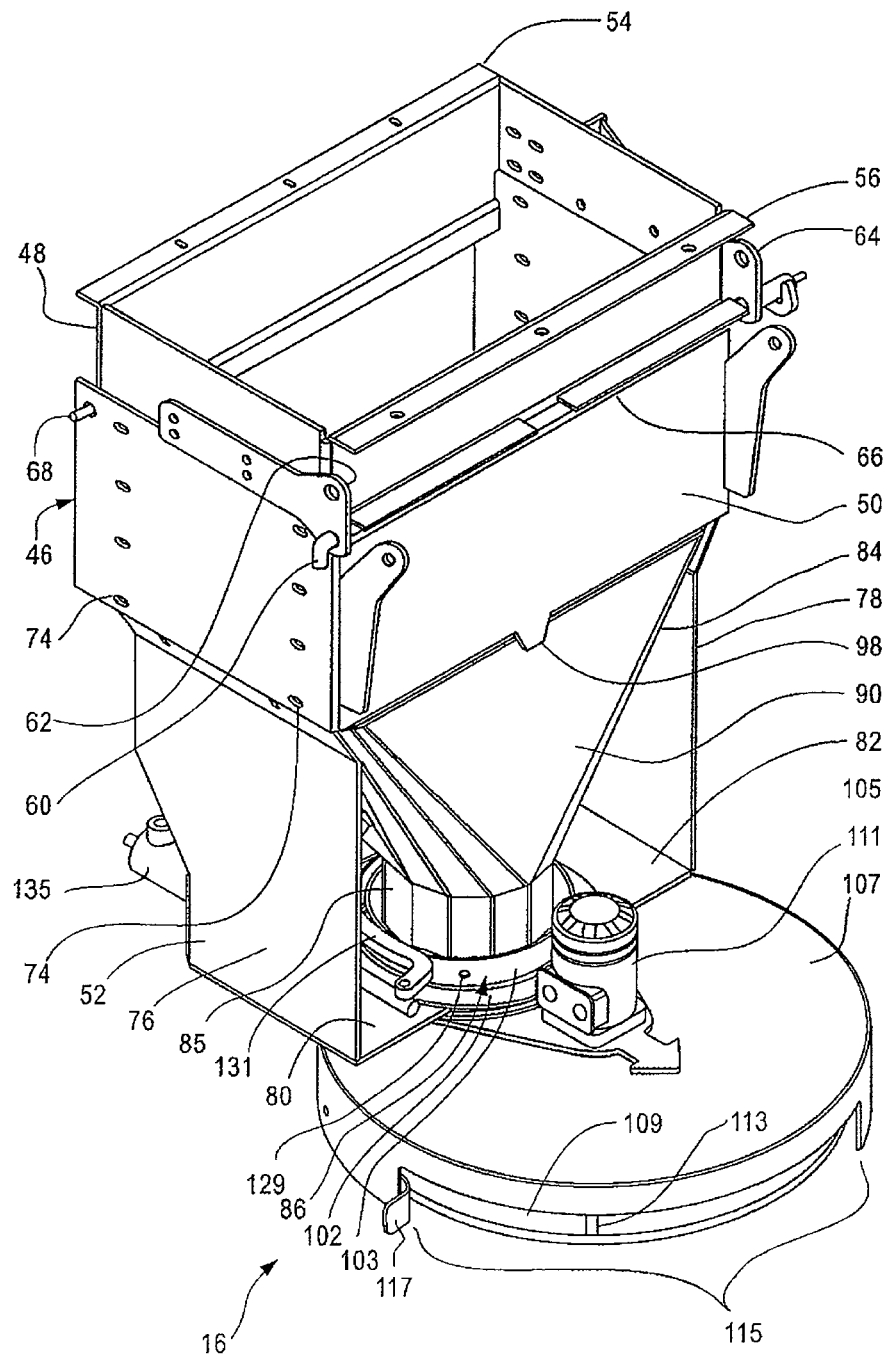
FIG. 3 is a perspective view of the spreader apparatus of FIG. 1.

As best illustrated through joint references to FIGS. 2 and 3, the ends of the augers 44 are disposed at a position above the material spreader 16 with an inlet feed defined by a box chute assembly designated generally as 46. The box chute assembly 46 includes an upper portion 48, a mid portion 50, and a lower portion 52 arranged in a generally stacked relation. The upper portion 48, mid portion 50 and lower portion 52 are each formed from a suitable material such as sheet metal, plastic or the like including combinations thereof. Corrosion resistant metals may be particularly preferred.

In other embodiments, the spreader apparatus described herein can be used on any suitable vehicle, including those equipped with a v-box spreader, a combination dump and spreader body, an under-tailgate-type spreader body, etc., and can be mounted to other components of the vehicle. For example, in some embodiments, the storage and dispensing apparatus can be omitted and the spreader apparatus 16 can be mounted to the body 14, which contains a conveyor assembly.

The upper portion 48 of the box chute assembly 46 defines an inlet for acceptance of granular material which the conveyor assembly 25 draws to the rear end 41 of the storage and dispensing apparatus 15 to fall down away from the augers 44. As seen through reference to FIGS. 3 and 4, the upper portion 48 of the box chute assembly 46 includes a forward edge flange 54 and a rear edge flange 56. The forward edge flange 54 and the rear edge flange 56 are adapted to be secured to the bottom of the storage and dispensing apparatus 15 by bolts or other fastening elements such that the upper portion 48 is substantially aligned with the corresponding opening at the rear end 41 of the storage and dispensing apparatus 15. Thus, as salt or other granular material is drawn to the rear end 41, such material will fall through the opening in the bottom of the storage and dispensing apparatus 15 and into the upper portion 48 of the box chute assembly 46 for passage to the mid portion 50.

In the illustrated exemplary arrangement, the upper portion 48 of the box chute assembly 46 is held in nested relation within the mid portion 50. As best illustrated in FIG. 3, in the illustrated arrangement, the upper portion 48 is secured to the mid portion 50 by a removable pin 60. Specifically, the pin 60 extends through openings in ear members 62, 64 that project from the rear of the upper portion 48 and along an acceptance channel 66 at the rear face of the mid portion 50 to define a pin and groove attachment. A corresponding locking arrangement may be used likewise across a front face of the box chute assembly 46 using a removable pin 68. Thus, by removing the pins 60, 68 the upper portion 48 may be separated from the mid portion 50 if desired.

Figure 4:
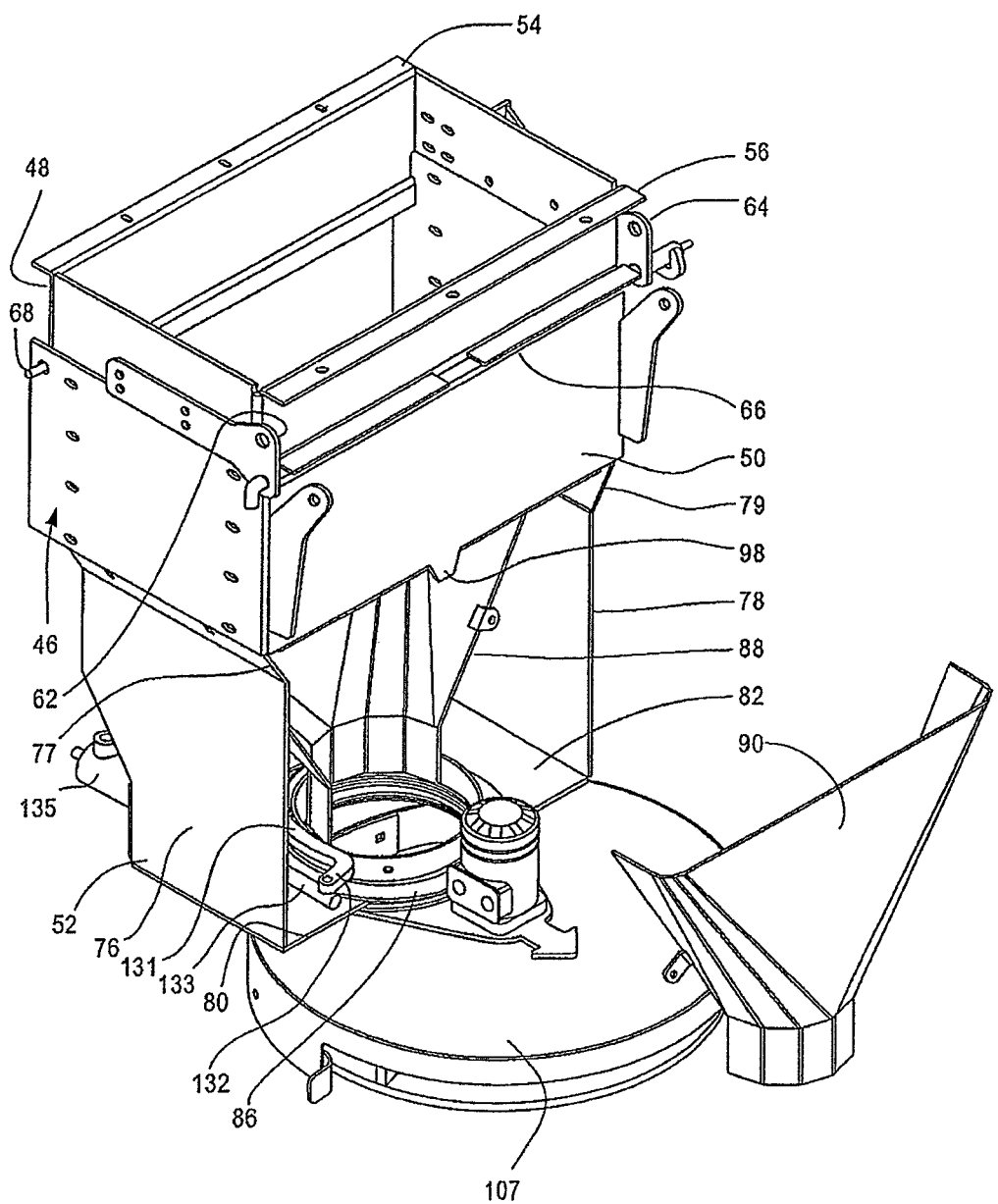
FIG. 4 is a view similar to FIG. 3 with a detachable cover removed for illustrative purposes.
Figure 5:
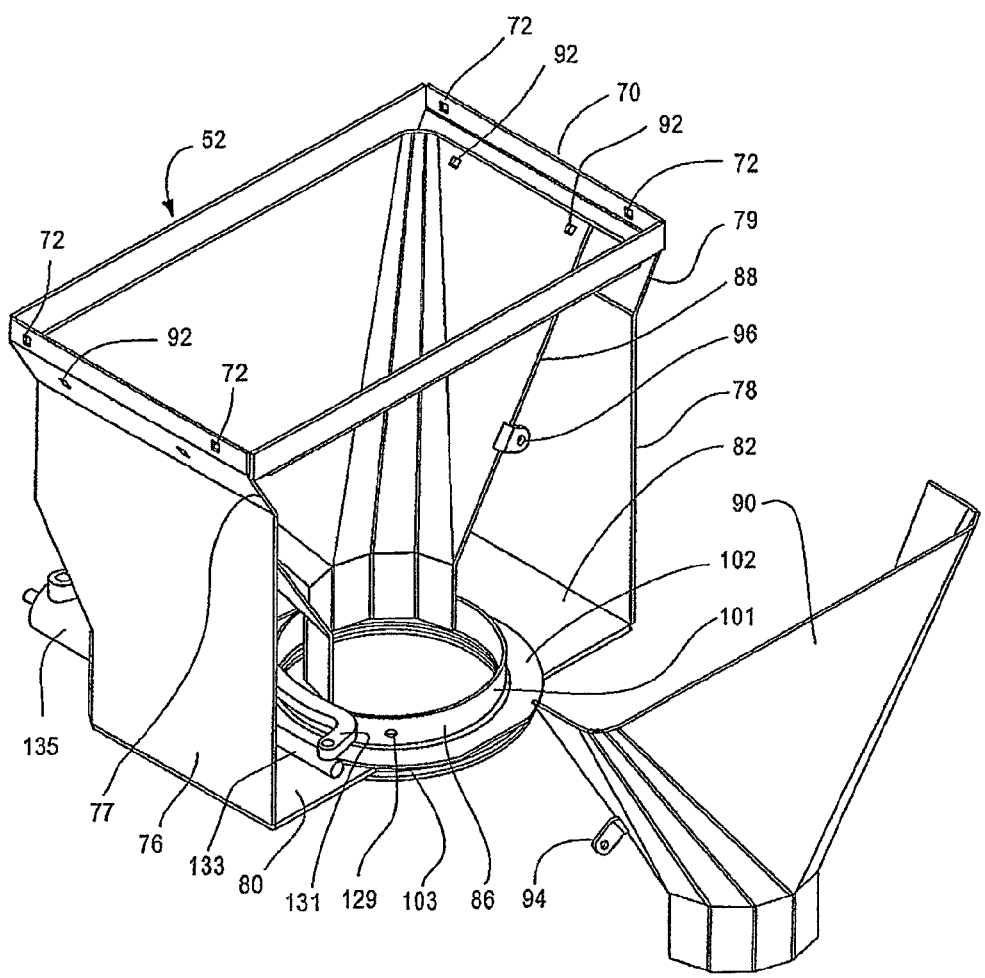
FIG. 5 is a perspective view of a lower chute assembly of the vehicle of FIG. 1 with a detachable cover removed for illustrative purposes.

Referring now jointly to FIGS. 3, 4, and 5, it may be seen that in the exemplary arrangement, the lower portion 52 of the box chute assembly 46 includes a generally rectangular upper rim 70 (FIG. 5) adapted to slide into the bottom of the mid portion 50. Bolts or other fastening elements (not shown) may extend through attachment openings 72 and aligned openings 74 disposed at lateral sides of the mid portion 50 to provide a secure attachment. In other embodiments, other attachment mechanisms can be utilized. As illustrated, the lower portion 52 of the box chute assembly 46 includes a pair of lateral walls 76, 78 which extend downwardly from inwardly angled slope segments 77, 79 below the base of the rim 70. The lateral walls 76, 78 intersect with inwardly projecting base segments 80, 82. The upper rim 70, slope segments 77, 79, lateral walls 76, 78 and base segments 80, 82 thus cooperate to define a box frame structure which is open across the top, front, and rear.

In the illustrated arrangement, the lower portion 52 further includes an interior converging chute structure 84. As illustrated, the converging chute structure 84 has a generally inverted pyramid configuration with the base of the pyramid disposed adjacent the upper rim 70 of the lower portion 52 of the box chute assembly 46. In the illustrated arrangement, the apex section 85 of the pyramid formed by the converging chute structure 84 is substantially circular although other geometries may be used if desired. As shown, the pyramid structure may be formed from one or more pieces of material such as sheet metal or the like with edges of adjacent pieces being joined by welding or other appropriate connection techniques. In this manner, substantially flat sheet material may be used to construct the three-dimensional converging chute structure 84.

As best seen through joint reference to FIGS. 4 and 5, in the exemplary construction, the converging chute structure 84 includes a fixed body portion 88 and a removable cover 90. As illustrated, the fixed body portion 88 and the removable cover 90 each include interior concave faces which are arranged in opposing relation to one another when the removable cover 90 is in place so as to define a converging material passageway for transport of granular matter leaving the body 14. In the illustrated exemplary construction, the fixed body portion 88 is secured in place adjacent to the upper rim 70 at attachment points 92. This connection can be made by spot welds, fasteners or other techniques as will be known to those with skill in the art.

The removable cover 90, which has a complementary profile relative to the fixed body portion 88, can be secured in place by cover brackets 94 (one shown) which align with opposing fixed body brackets 96 (one shown) using bolts or other removable fastening devices. As best illustrated in FIG. 3, an upper edge of the removable cover 90 is held behind a tongue member 98 which projects downwardly from a lower edge of the mid portion 50 of the box chute assembly 46. This arrangement provides stable three-point engagement of the removable cover 90 relative to the fixed body portion 88 while nonetheless permitting easy removal of the cover 90 to permit cleaning of the interior of the converging chute structure 84 if desired.

As will be appreciated, granular material deposited into the upper portion 48 of the box chute assembly 46 passes through the mid portion 50 and into the converging chute structure 84, which is supported within the box frame structure of the lower portion 52. The granular material is then funneled to the apex section 85 of the converging chute assembly by gravity feed for discharge in substantial alignment with the apex section 85.

Figure 7:
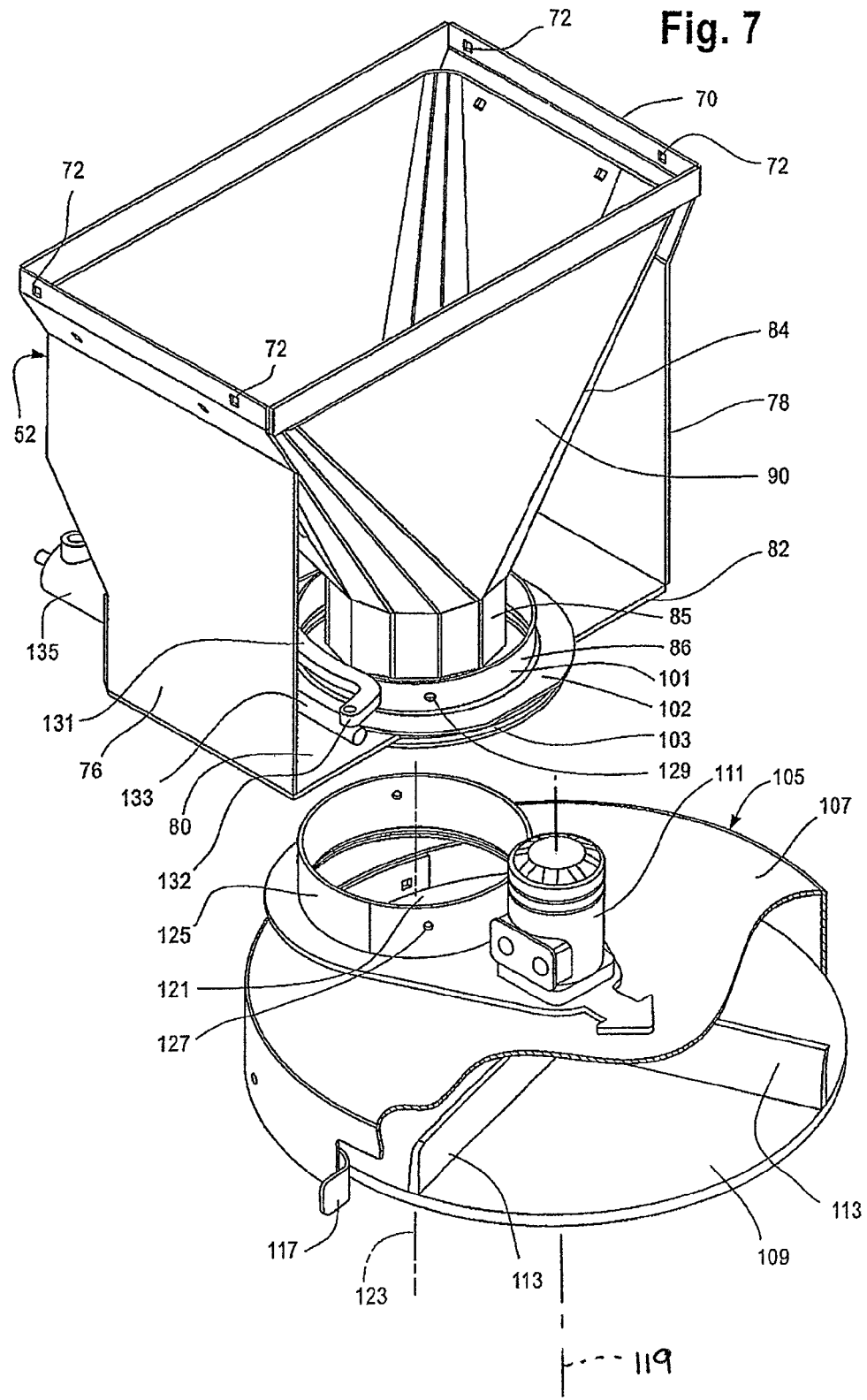
FIG. 7 is an exploded perspective view of the spreader apparatus of FIG. 1, illustrating the alignment between a material pass-through opening in a spinner disc shroud and an overlying converging chute with a portion of the spinner disc shroud broken away to show vanes for transferring material outwardly.

Referring to FIG. 3, as shown, the apex section 85 of the converging chute structure is disposed within an opening defined by a rotatable turret assembly 86. As best illustrated in FIGS. 5 and 7, the exemplary rotatable turret assembly 86 includes a turret ring 101 extending upwardly from a turret base 102 with a circumferential channel 103 running between the upper and lower surfaces of the turret base 102. The circumferential channel 103 is adapted to accept and retain inboard edges of the base segments 80, 82 of the lower portion 52 of box chute assembly 46. Thus, the rotatable ring assembly 86 may rotate relative to the box chute assembly 46 and around the apex section 85 of the converging chute structure 84. In some embodiments, the degree of permitted rotation can be limited to a defined angle.

Figure 6:
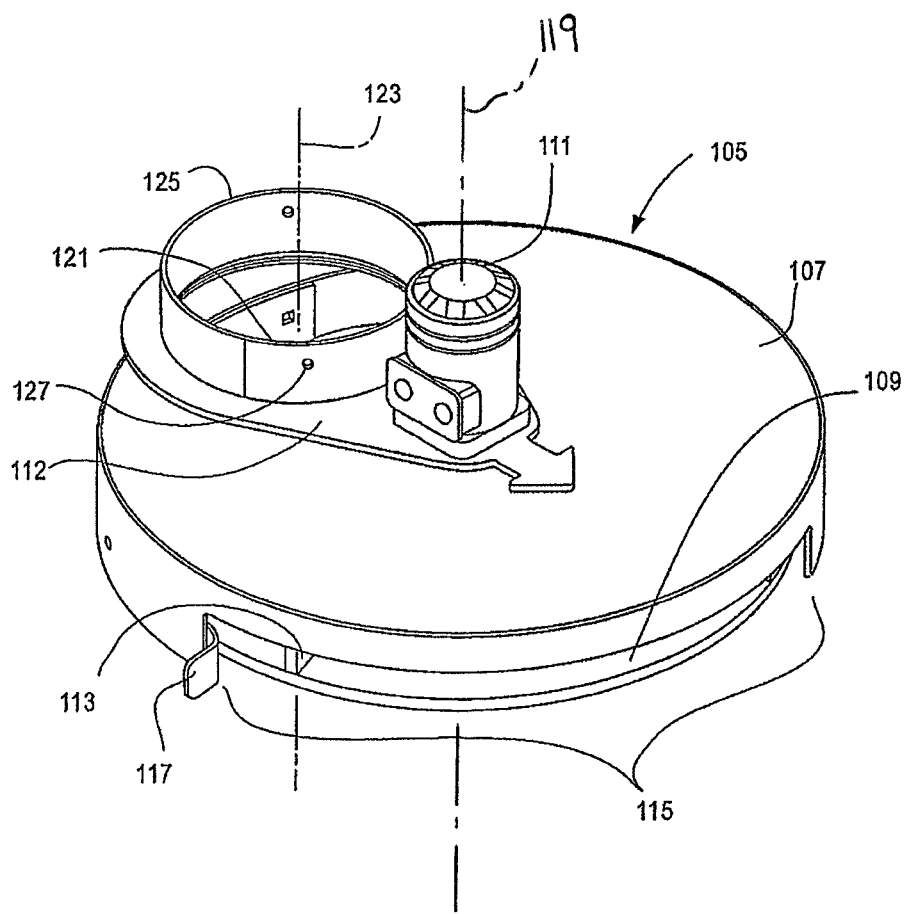
FIG. 6 is a perspective view of a discharge disc assembly of the spreader apparatus of FIG. 1.

Referring to FIG. 6, the material spreader 16 includes a discharge disc assembly designated generally as 105. The discharge disc assembly 105 includes a shroud 107 disposed in overlying covering relation to a spinner disc 109 (see FIG. 7 also). The spinner disc 109 is operatively connected to a variable speed drive 111, such as an electric motor or the like. Thus, upon activation of the variable speed drive 111, the spinner disc 109 will spin within the shroud 107 about a central axis 119 of rotation.

Referring to FIG. 7, in the illustrated exemplary construction, the spinner disc 109 includes a number of raised ribs 113 extending radially outwardly from a central location in a spoke-like manner. The ribs 113 guide granular material towards the perimeter of the spinner disc 109 as it spins about the central axis 119 of rotation. The rotational speed of the spinner disc 109 may be adjusted by an operator using an electronic controller (not shown) operatively linked to the variable speed drive 111.

As illustrated in FIG. 8A, the variable speed drive 111 may be mounted on a support platform 112 disposed across the upper surface of the shroud 107. Bolts 114 or other suitable connection elements may extend downwardly from the variable speed drive 111 and through the upper surface of the shroud 107 to secure the support platform 112 and the variable speed drive 111 in place relative to the shroud 107. In this arrangement, a rotatable drive shaft 116 extends from the variable speed drive 111 along the central axis 119 and through an opening in the shroud 107 such that the drive shaft 116 may rotate freely relative to the shroud 107.

As shown, the spinner disc 109 may include a substantially centrally-located connection hub 118 having an outer sleeve 120 adapted to matedly engage the rotatable drive shaft 116 extending from the variable steed drive 111. A removable pin connection 122 or other suitable attachment mechanism may be used to secure the outer sleeve 120 about the rotatable drive shaft 116. Thus, the spinner disc 109 depends from the drive shaft 116, and rotation of the drive shaft 116 is translated to the spinner disc 109 during operation.

As illustrated in FIG. 6, the shroud 107 is discontinuous around a portion of its perimeter to define a discharge opening 115 extending for a defined arc segment about the perimeter of the spinner disc 109. The effective length of the discharge opening 115 may be adjusted by the extension or retraction of a slidable diverter 117. Thus, while the various figures illustrate the diverter 117 in a substantially retracted mode, the diverter 117 may be extended as may be desired to substantially shorten or close off the discharge opening 115.

By way of example only, and not limitation, the diverter 117 may be a curved metal strip having a radius of curvature generally conforming to the curvature of the perimeter of the shroud 107 such that upon withdrawal of the diverter, the diverter extends in a curved relation along a portion of the discharge opening 115 thereby reducing the effective length of the discharge opening 115. In other embodiments, the diverter can be adapted to selectively adjust the length of the discharge opening from both ends of the opening.

As will be appreciated, when particulate material is deposited onto the spinner disc 109, that material is carried by centrifugal force outwardly towards the edge of the spinner disc 109. As the material moves outwardly, it is expelled through the discharge opening 115 for deposit onto a roadway surface as will be described further hereinafter.

Referring to FIG. 6, the shroud 107 includes a pass-through opening 121 for passage of granular material discharged through the apex section 85 of the converging chute structure 84. In this regard, the pass-through opening 121 is oriented radially forward of the central axis 119 of spinner disc rotation, which is defined generally by the position of drive 111. In particular, the pass-through opening 121 is disposed along an axis 123 which is disposed in substantially coaxial relation with the outlet of the converging chute assembly 84 and the opening in the turret ring 101. Thus, material flows generally along the axis 123 as it passes from the converging chute structure 84 to the spinner disc 109.

In the exemplary embodiment, the pass-through opening 121 is surrounded by a shroud attachment ring 125 which is secured in fixed relation to the support platform 112. By way of example, such secure attachment may be made by welding or other appropriate techniques. The shroud attachment ring 125 is sized to fit into the annular space between the apex section 85 and the turret ring 101. In this regard, the outer diameter of the shroud attachment ring 125 is approximately the same as the inner diameter of the turret ring 101 such that a close fit relationship is achieved. With the shroud attachment ring 125 in place, the turret ring 101 and the attachment ring 125 may be secured to one another by bolts or other fastening devices extending through aligned connection openings 127 (FIG. 6), 129 (FIG. 5). As will be appreciated, once a secure connection is established between the turret ring 101 and the shroud attachment ring 125, rotational movement of the turret assembly 86 about axis 123 causes the entire discharge disc assembly 105 to rotate correspondingly. Such rotational movement permits adjustment of the orientation of the discharge opening 115 relative to the travel path of vehicle 10.

As previously noted, axis 123 corresponds generally to the flow path of salt or other granular material as it travels out of the chute structure and through the pass-through opening 121 for deposit onto the upper surface of the spinner disc 109. Axis 123 also defines a pivot axis for rotational movement of the discharge disc assembly 105. That is, both the shroud 107 and the spinner disc 109 may pivot about axis 123 which runs through the pass-through opening 121. This pivoting action causes the position of the discharge opening 115 to be adjusted relative to the travel path of the vehicle 10 during operation.

In the exemplary embodiment, the articulated pivoting movement of the discharge disc assembly 105 is carried out by applying a torque about the shroud attachment ring 125 which is held in fixed relation to the shroud 107. As the shroud attachment ring 125 rotates about axis 123, the discharge disc assembly 105 pivots through a corresponding angle. Rotation of the shroud attachment ring 125 causes the discharge disc assembly 105 to move in an arc generally about axis 123 as rotational movement is translated from the shroud attachment ring 125 to the shroud 107. Since the spinner disc 109 rides within the shroud 107, any pivoting movement of the shroud 107 is also translated to the spinner disc 109. Thus, both the shroud 107 and the spinner disc 109 move in conjunction with one another through substantially the same pivot angle.

As best seen through joint reference to FIGS. 3, 7 and 8, the base 102 of the turret assembly 86 defines a radial flange surface. In the exemplary embodiment, a proximal end 130 of a j-bar link 131 is attached to an upper surface of the base 102 such that a distal end 132 of the j-bar link 131 projects outwardly away from the turret assembly 86 as shown. In this orientation, the distal end 132 of the j-bar link 131 is pivotally attached to a piston arm 133 of an actuating cylinder 135 such as a hydraulic cylinder or the like. Thus, as the piston arm 133 is extended or retracted, the resultant movement of the j-bar link causes the rotatable ring assembly 86 to rotate, thereby causing a corresponding articulation of the discharge disc assembly 105. It is to be understood that while the use of a hydraulic or pneumatic cylinder in combination with a linking arm may provide controlled articulation, other systems such as direct drives and the like may also be used in other embodiments.

In the exemplary arrangement, the shroud 107 maintains a covering relation relative to the spinner disc 109 throughout any rotational movement and the relative position of the spinner disc 109 within the shroud 107 does not significantly change. Thus, the angle of the discharge opening 115 of the discharge disc assembly 105 relative to the travel path of the vehicle may be adjusted while maintaining the covering relation of the shroud 107 over the spinner disc. Moreover, the pivot axis 123 for the discharge disc assembly 105 runs through the pass-through opening 121 in the shroud 107. Thus, the pass-through opening remains in substantial alignment with the outlet of the converging chute structure 84 during any pivoting action of the discharge disc assembly 105. In this arrangement, the salt or other granular material may flow in a substantially straight line gravity feed path from the converging chute structure 84 to the spinner disc 109 and this path will remain substantially unchanged as the discharge disc assembly 105 is articulated through various angular positions.

Referring now to FIGS. 8 and 9a-9c, it may be seen that rotation of the discharge disc assembly 105 may be used to adjust the direction of material discharge relative to the travel path of the vehicle 10. In particular, using the arrangement illustrated in FIG. 8, when the piston arm 133 is in an intermediate position (FIG. 9b), the granular material will be discharged in a generally conical, or fan-shaped, pattern in substantial alignment with the travel direction of the vehicle 10. Alternatively, in the event that the piston arm 133 is extended (FIG. 9a), the discharge disc assembly 105 is articulated counterclockwise relative to the travel direction of the vehicle 10 thereby causing the particulate material to be expelled at an angle offset counterclockwise from the travel direction of the vehicle. Likewise, in the event that the piston arm 133 is retracted, the discharge disc assembly 105 is rotated clockwise relative to the travel direction of the vehicle (FIG. 9c) thereby causing a corresponding clockwise shift in the discharge pattern of the material relative to the travel direction of vehicle 10.

In operation, the material spreader 16 of the present invention provides an operator with a substantial degree of flexibility in adjusting the discharge of material to a roadway or other surface. Specifically, an operator by use of electronic controls (not shown) can adjust the rotational speed of the spinner disc 109 by control of the variable speed drive 111. At higher velocities, the width of the broadcast pattern is also increased, thereby causing distribution of the material across a wider area.

In the event that an operator wishes to adjust the broadcast width, such adjustment may be carried out by opening or closing the diverter 117 to adjust the width of the discharge opening 115. As will be recognized, by reducing the width of the discharge opening 115, the width of the broadcast pattern is also reduced. Thus, the variable speed spinner disc 109 and the diverter 117 may be used either independently or in conjunction with one another to manipulate the broadcast pattern of expelled material.

The direction of the material discharge may be substantially controlled by the articulated positioning of the discharge disc assembly 105 about axis 123 as described. In particular, by articulating the discharge disc assembly 105 in either clockwise or counterclockwise orientation relative to the travel path of the vehicle, material can be broadcast either directly behind the vehicle or to either side as may be desired. In this regard, the discharge orientation may be held at one position during operation or may be adjusted periodically or continuously to provide a desired broadcast pattern.

The following examples further illustrate the invention but, of course, should not be construed as in any way limiting its scope.

EXAMPLE 1

In-Line Discharge Over Narrow Roadway

Figure 9A:
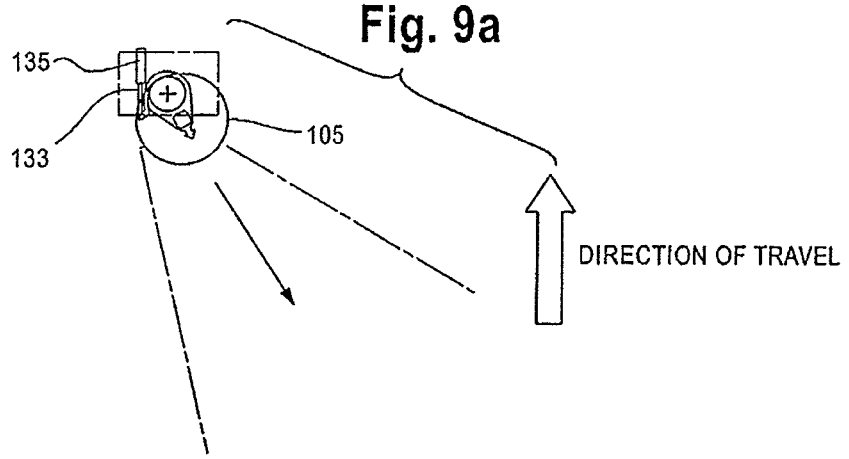
FIGS. 9a-9c illustrate schematically the articulation of the spinner disc through various angles by use of the articulation system illustrated in FIG. 8.
Figure 9B:
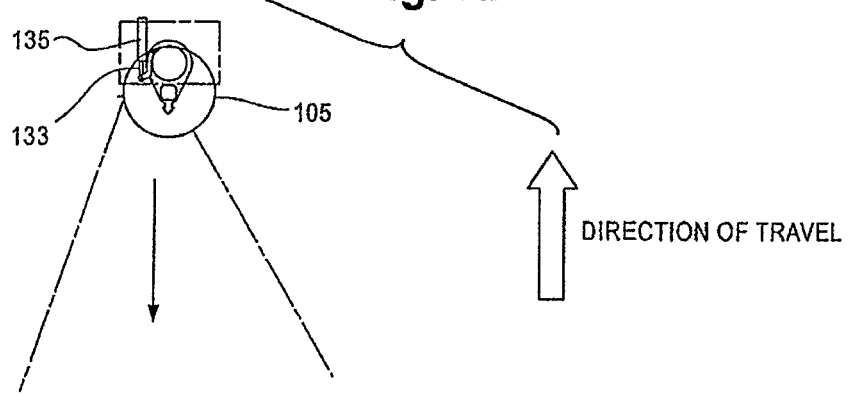

To apply salt or other granular material over a relatively narrow roadway directly behind a vehicle, the discharge disc assembly 105 may be set in an intermediate neutral position such that its centerline indicated by an arrow on the exterior surface of the shroud 107 is substantially in line with the centerline of the vehicle 10 (see FIG. 9b). The diverter 117 may be partially extended to cover a portion of the discharge opening 115 such that the discharge opening is narrowed to some degree.

EXAMPLE 2

Adjacent Lane Discharge Over Narrow Roadway

Figure 9C:
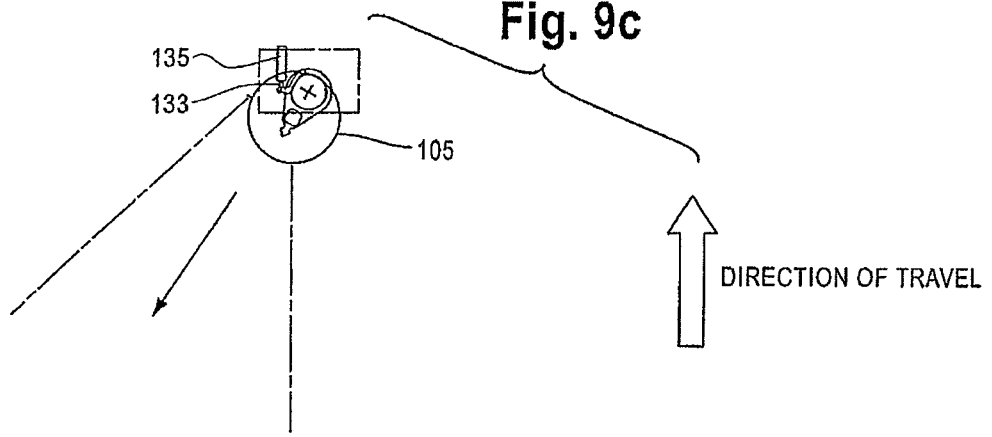

To apply salt or other granular material over a relatively narrow roadway surface adjacent to the travel path of the vehicle, the discharge disc assembly 105 may be set in an appropriate articulated position such that its discharge centerline, indicated by the arrow on the surface of the shroud 107, is disposed in the desired angle (see FIGS. 9a and 9c). The diverter 117 may be partially extended to cover a portion of the discharge opening 115 such that the discharge opening is narrowed to some degree. The procedure as described in relation to Example 1 may then be carried out.

EXAMPLE 3

Discharge Over Wide Surface

In the event that a broad dispensing pattern is desired, the diverter 117 may be fully retracted such that the discharge opening 115 has the maximum opening possible. With the diverter 117 in this condition, the speed of the spinner disc may be set at the maximum rate so as to produce a wide broadcast cone. The actuating cylinder 135 may be set to cycle the piston arm back and forth so as to cause a corresponding articulation of the discharge disc assembly 105 through a wide pattern during use. This procedure can provide a wide and highly dispersed broadcast pattern.

As will be appreciated, the present invention provides the material spreading system which is highly functional and which can be tuned by the operator to deliver a variety of broadcast patterns with both directional and speed control. In particular, each of the adjustments can be made independently or in conjunction with one another to provide a desired broadcast character.

Of course, variations and modifications of the foregoing are within the scope of the present invention. For example, in other embodiments, the material spreading system can be used in a vehicle in which it is directly mounted to a dump body thereof. In some embodiments, for example, the material spreading system can be incorporated into a tailgate of a dump body. Thus, it is to be understood that the invention disclosed and defined herein extends to all alternative combinations of two or more of the individual features mentioned or evident from the text and/or drawings. All of these different combinations constitute various alternative aspects of the invention. The embodiment described herein explain the best modes for practicing the invention and will enable others skilled in the art to utilize the invention. The claims are to be construed to include alternative embodiments and equivalents to the extent permitted by the prior art.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Various features of the invention are set forth in the following claims.

What is claimed is:

1. A material spreader adapted to dispense granular material from a vehicle, the material spreader comprising:
   a feed chute having a discharge opening; and
   a discharge disc assembly disposed below the feed chute, the discharge disc assembly including:
   a spinner disc adapted to receive granular material from the feed chute, a shroud disposed in at least partial covering relation to the spinner disc, and
a rotational drive operatively connected to the spinner disc such that the spinner disc is rotatable within the shroud about a rotational axis,
wherein the shroud includes a pass-through opening disposed in substantially aligned relation with the discharge opening of the feed chute at a position radially removed from the rotational axis;
wherein the discharge disc assembly is rotatably mounted in pivoting relation about a pivot axis extending through the pass-through opening and the discharge opening of the feed chute such that the discharge disc assembly is selectively rotatable through an angle about the pivot axis.

2. The material spreader as recited in claim 1, wherein the feed chute includes a converging chute of substantially inverse pyramid shape disposed at the interior of a box frame.

3. The material spreader as recited in claim 2, wherein the converging chute of substantially inverse pyramid shape includes a substantially circular apex segment.

4. The material spreader as recited in claim 2, wherein the converging chute of substantially inverse pyramid shape includes a fixed body portion and a removable cover portion.

5. The material spreader as recited in claim 4, wherein the fixed body portion is secured in place relative to the box frame.

6. The material spreader as recited in claim 2, wherein the discharge disc assembly is operatively connected to the box frame at a turret connection comprising a rotatable ring disposed in surrounding relation to an apex of the converging chute, the rotatable ring being held in rotating relation to base segments of the box frame.

7. The material spreader as recited in claim 6, wherein a shroud attachment ring projects from an upper surface of the shroud in surrounding relation to the pass-through opening, the shroud attachment ring adapted for insertion into an annular opening between the apex of the converging chute and the rotatable ring for attachment to the rotatable ring.

8. The material spreader as recited in claim 1, wherein the shroud includes a discharge opening disposed along a portion of the perimeter of the shroud, and wherein an extensible and retractable diverter is slidably adjustable across at least a portion of the discharge opening to adjust a discharge pattern of the granular material through the discharge opening.

9. A material spreader adapted to dispense granular material from a vehicle, the material spreader comprising:
a feed chute having a discharge opening;
a discharge disc assembly disposed below the feed chute, the discharge disc assembly including:
a spinner disc adapted to receive granular material from the feed chute,
a shroud disposed in at least partial covering relation to the spinner disc, and
a rotational drive operatively connected to the spinner disc such that the spinner disc is rotatable within the shroud about a substantially central rotational axis,
wherein the shroud includes a pass-through opening disposed in substantially aligned relation with the discharge opening of the feed chute at position radially removed from the central rotational axis; and
a turret connection holding the discharge disc assembly in pivoting relation about a pivot axis extending through the pass-through opening and the discharge opening of the feed chute such that the discharge disc assembly rotates through an angle about the pivot axis upon rotation of the turret connection.

10. The material spreader as recited in claim 9, further comprising:
a linear drive member having a selectively extensible and retractable arm operatively connected to a portion of the turret connection such that extension or retraction of the arm produces rotational movement of the turret connection and corresponding articulation of the discharge disc assembly.

11. The material spreader as recited in claim 10, wherein the feed chute includes a converging chute of substantially inverse pyramid shape disposed at the interior of a box frame.

12. The material spreader as recited in claim 11, wherein the converging chute of substantially inverse pyramid shape includes a substantially circular apex segment.

13. The material spreader as recited in claim 11, wherein the converging chute of substantially inverse pyramid shape includes a fixed body portion and a removable cover portion.

14. The material spreader as recited in claim 13, wherein the fixed body portion is secured in place relative to the box frame.

15. The material spreader as recited in claim 11, wherein the turret connection comprises a rotatable ring adapted for disposition in surrounding relation to an apex of the converging chute, the rotatable ring being held in rotating relation to base segments of the box frame.

16. The material spreader as recited in claim 15, wherein a shroud attachment ring projects from an upper surface of the shroud in surrounding relation to the pass-through opening, the shroud attachment ring adapted for insertion into an annular opening between the apex of the converging chute and the rotatable ring for attachment to the rotatable ring.

17. The material spreader as recited in claim 10, wherein the shroud includes a discharge opening disposed along a portion of the perimeter of the shroud, and wherein an extensible and retractable diverter is slidably adjustable across at least a portion of the discharge opening to adjust the discharge pattern of the granular material through the discharge opening.

18. A vehicle comprising:
a chassis;
a body mounted on the chassis, the body adapted to store mass of granular material;
a conveyor assembly adapted to transport the granular material out of the body; and
a material spreader including a feed chute adapted to receive granular material from the conveyor assembly and to discharge granular material out a discharge opening thereof and a discharge disc assembly disposed below the feed chute, the discharge disc assembly including:
a spinner disc adapted to receive granular material from the discharge opening of the feed chute,
a shroud disposed in at least partial covering relation to the spinner disc, and
a rotational drive operatively connected to the spinner disc such that the spinner disc is rotatable within the shroud about a substantially central rotational axis,
wherein the shroud including a pass-through opening disposed in substantially aligned relation with the discharge opening of the feed chute at a position radially removed from the central rotational axis,
wherein the discharge disc assembly is rotatably mounted in pivoting relation about a pivot axis extending through the pass-through opening and the discharge opening of the feed chute such that the discharge disc assembly is selectively rotatable through an angle about the pivot axis.

19. The vehicle as recited in claim 18, wherein the discharge disc assembly of the material spreader includes:

a turret connection rotatably mounting the discharge disc assembly in pivoting relation about the pivot axis extending through the pass-through opening and the discharge opening of the feed chute such that the discharge disc assembly rotates through an angle about the pivot axis upon rotation of the turret connection.

20. The vehicle as recited in claim 19, further comprising:

at least one fluid holding tank in fluid communication with a liquid dispensing system for application of liquid to a surface supporting the vehicle.

21. The vehicle as recited in claim 20, further comprising:

a storage and dispensing apparatus disposed within the body, the conveyor assembly and the at least one fluid holding tank disposed within the storage and dispensing system.

22. The vehicle as recited in claim 19, further comprising:

a linear drive member having a selectively extensible and retractable arm operatively connected to a portion of the turret connection such that extension or retraction of the arm produces rotational movement of the turret connection and corresponding articulation of the discharge disc assembly.

23. The vehicle as recited in claim 22, wherein the feed chute includes a converging chute of substantially inverse pyramid shape disposed at the interior of a box frame, and wherein the turret connection comprises a rotatable ring adapted for disposition in surrounding relation to an apex of the converging chute, the rotatable ring being held in rotating relation to base segments of the box frame, and wherein a shroud attachment ring projects from an upper surface of the shroud in surrounding relation to the pass-through opening, the shroud attachment ring adapted for insertion into an annular opening between the apex of the converging chute and the rotatable ring for attachment to the rotatable ring.

* * * * *